United States Patent [19]
Misawa

[11] Patent Number: 4,724,454
[45] Date of Patent: Feb. 9, 1988

[54] AUTO-FOCUS SINGLE LENS REFLEX CAMERA

[76] Inventor: Isao Misawa, 6-Go, Wakame-sou, 1-31-12 Higashi-nogawa, Komae-Shi, Tokyo, Japan

[21] Appl. No.: 9,797

[22] Filed: Feb. 2, 1987

[30] Foreign Application Priority Data

Feb. 3, 1986 [JP] Japan ............................... 61-20076

[51] Int. Cl.$^4$ .............................................. G03B 3/00
[52] U.S. Cl. .................................................. 354/402
[58] Field of Search ............ 354/400, 401, 402, 195.1; 352/140

[56] References Cited

U.S. PATENT DOCUMENTS

| | | | |
|---|---|---|---|
| 4,156,567 | 5/1979 | Ostrowski | 354/400 X |
| 4,160,590 | 7/1979 | Reynard | 354/401 |
| 4,449,807 | 5/1984 | Miki et al. | 354/195.1 |
| 4,575,210 | 3/1986 | Yamada et al. | 354/400 |
| 4,627,699 | 12/1986 | Takagi | 354/400 |

Primary Examiner—W. B. Perkey
Attorney, Agent, or Firm—Stiefel, Gross, Kurland & Pavane

[57] ABSTRACT

An auto-focus single-lens reflex camera in which manual focusing can be conducted using a manual focusing member provided on the focusing lens (7), in addition to the switching over of the operation mode between auto-focusing and manual focusing, by providing means for judging whether the amount of shift of the position of a point at which the image of the subject is formed is within a focused range, the amount of shift being detected in the camera body in the auto-focusing mode, and by engaging a normally disengaged lens side drive means (2,3,4,5) and camera side autofocus drive means (8,9,10,11,13) through a clutch member (14) controlled by the judging means, with the autofocus drive means being engaged with the lens drive means only when it is necessary to drive the autofocus motor, a compression spring (12) normally disengaging the camera side drive means from the lens side drive means until the clutch is enabled to overcome the resilient force.

7 Claims, 2 Drawing Figures

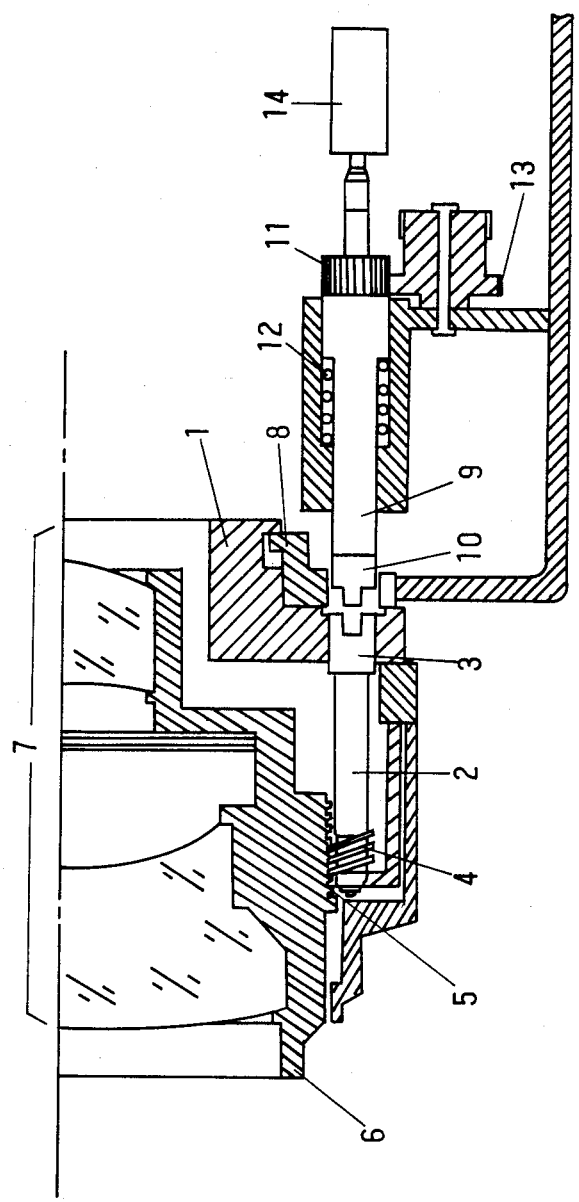

AUTO-FOCUS SINGLE LENS REFLEX CAMERA

BACKGROUND OF THE INVENTION

1. Field of the Invention

The present invention relates to an auto-focus single-lens reflex camera which has an auto-focusing device, and which is capable of being switched over to a manual focusing operation after focusing has been performed automatically.

2. Description of the Prior Art

In a known auto-focus single-lens reflex camera having an auto-focusing function, the operation of the camera is switched over from an auto-focusing mode to a manual focusing mode or from a manual focusing mode to an auto-focusing mode by operating a switch-over button or the like. This type of camera is therefore equipped with a manual switch or the like, and is inconvenient in use. When it is detected that distance-measuring is impossible in the auto-focusing mode and the AF motor is stopped, a button or the like must be operated to switch over the operation mode to the manual focusing mode. Further, when shooting photographs in the auto-focusing mode, it is impossible to focus the focusing lens on a subject located outside the distance measuring zone at the center of a view finder without changing the picture composition. In such a case, the operation mode must be switched over to a manual focusing mode by operating a switch-over button or the like so as to correct the focusing. Such an operation is very troublesome, and the driving mechanism of the lens may be damaged if the manual focusing member provided on a focusing lens is forcibly and carelessly moved before the operation mode is switched over to the manual focusing mode.

These disadvantages of the prior art are overcome by the present invention, which provides an auto-focusing device which allows the focusing mode of a camera to be switched over from the auto-focusing mode to the manual focusing mode in a simplified manner when the distance from a subject cannot be measured in the auto-focusing mode or when it is desired to adjust a focused position intentionally. This is accomplished by automatically conducting in the auto-focusing mode the switching over of the operation mode between the auto-focusing and manual focusing modes in the auto-focusing mode by controlling its operation within the camera body.

SUMMARY OF THE INVENTION

In an auto-focusing mode, when a signal representing the fact that focusing has been performed or that distance measuring is impossible is output by the CPU in the camera body to an AF motor control circuit, a stop signal is supplied by the AF motor control circuit to the AF motor, and the AF motor is stopped. In this condition, if it is desired to switch over the operation mode to a manual focusing mode, it is conventionally done by operating a switch-over button. However, in the auto-focus single-lens reflex camera according to the present invention, the manual focusing can be conducted using a manual focusing member provided on the focusing lens, in addition to the switching over of the operation mode between an auto-focusing and a manual focusing mode, by providing means for judging whether or not the amount of shift of the position of a point at which the image of a subject of focusing has been formed from the desired position of a point at which the image of the subject is formed is within a focused range, the amount of shift being detected in the camera body in the auto-focusing mode, and by engaging a lens side drive means and a camera side drive means, which are normally disengaged, only when it is necessary to drive the AF motor. Thus, it is possible to perform focusing with respect to a subject located outside the distance-measuring zone, which conventionally cannot be achieved in the auto-focusing mode. Further, when the AF motor is stopped, the couplers are disconnected by means of a clutch control circuit. Therefore, the driving mechanism of the lens which is provided in the camera body is not affected, even if the manual focusing member provided on the focusing lens is moved carelessly.

BRIEF DESCRIPTION OF DRAWINGS

FIG. 2 is a fragmentary cross-sectional view of the coupling arrangement employed in the camera of FIG. 1.

DETAILED DESCRIPTION OF THE INVENTION

Figure 1:
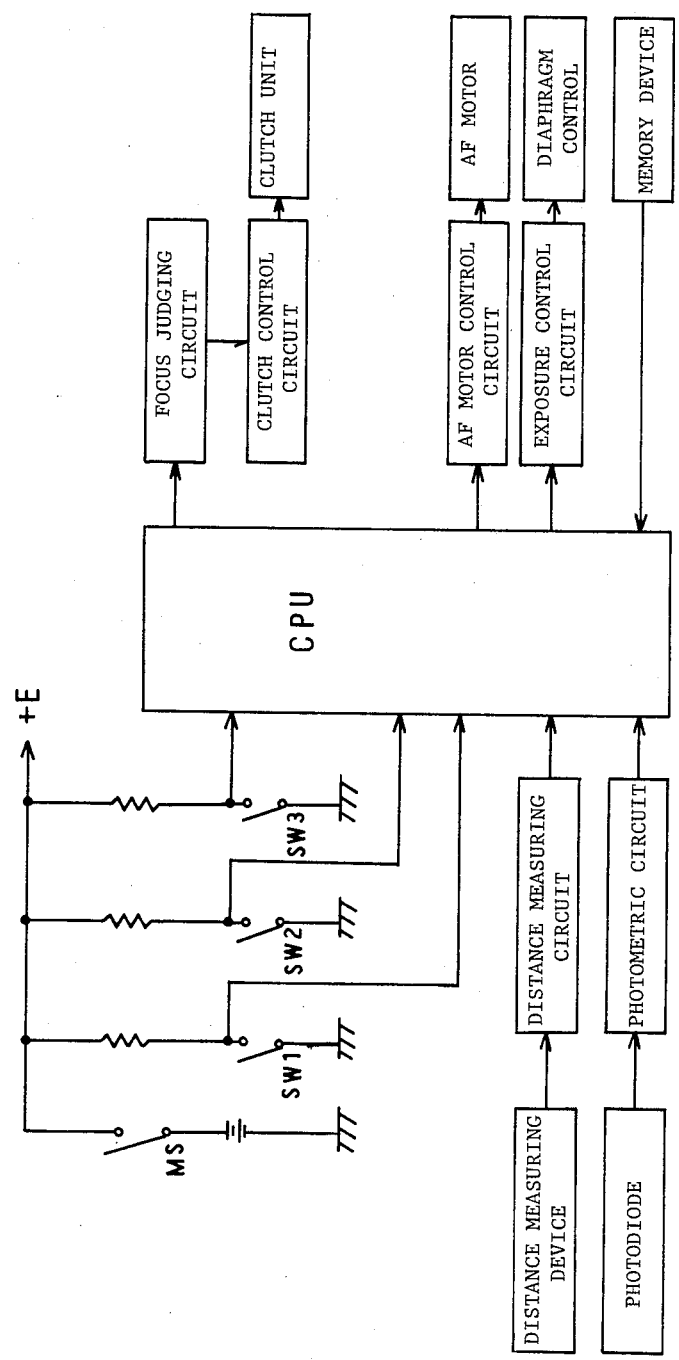
FIG. 1 is a block diagram, partially in schematic, of an auto focus single lens reflex camera in accordance with the present invention.

Referring to the drawings in detail, and initially to FIG. 1, FIG. 1 is a block diagram of a camera system in accordance with the present invention. Reference (BT) denotes a battery for supplying power to the camera. Reference (MS) designates a power supply switch which is manually closed. Power is supplied through a power supply line (+E) to a conventional microprocessor or CPU when the power supply switch (MS) is closed. Reference (SW1) represents a photometric and distance measuring switch which is closed when a release button (not shown in the drawing) is pressed manually. When this switch (SW1) is closed, lens data representing the characteristics of the lens employed, i.e., the full aperture F-number and the factor representing the ratio of focusing distance to the amount of movement of a lens driving mechanism, is conventionally input from the lens, such as from a conventional storage device in the photographic lens. Subsequently, the state of the light transmitted through the photographic lens is conventionally detected by a conventional distance measuring device in a conventional distance measuring circuit, and calculation of the distance is thereby conventionally performed. The calculation results are converted into an electric signal and are preferably input to the CPU. The amount of shift appearing on a film surface is then preferably calculated from the input distance value, so that the amount of movement of a lens drive mechanism is operated on the basis thereof and characteristic data on the employed photographic lens. The operation results are then output to a conventional AF motor control circuit. Thus, photometry is conventionally conducted by detecting the condition of the light transmitted through the conventional photographic lens by means of photo detectors located in the conventional photometric circuit. The detected value corresponding to the luminance data is converted into an electric signal and is also input to the CPU, so that the shutter speed and aperture value may then be conventionally calculated employing the photometric value obtained and the characteristic lens data from the conventional photographic lens being employed.

Reference (SW2) represents a focusing switch which is closed when the release button (not shown in the drawing) is depressed to a first position. Preferably, when the focusing switch (SW2) is closed, a judgement is made by a conventional focus judging circuit, based on the results of the distance measuring operation, whether the amount of shift is within a focused range or not. If a decision is made that the amount of shift is outside the focused range, a signal to operate a clutch is output to a conventional clutch control circuit so as to preferably couple a camera side AF coupler to a lens side coupler (FIG. 2). On the other hand, if it is decided by the focus judging circuit that the amount of shift is within the focused range (in other words, that the lens is focused), or that distance measurement is impossible, no signal is output to the clutch control circuit, and the operation mode is switched over to a manual focusing mode in which focusing can be conventionally conducted manually using a manual focusing member.

Focusing is conventionally performed by the AF motor in accordance with the signal output to the AF motor control circuit by rotating a lens side drive shaft through the AF couplers, operating the internal mechanism of the focusing lens and thereby moving the focusing lens in a focused direction to a focused position. Photometry and distance measurement are continued during the focusing: a value corresponding to the luminance data is preferably continuously detected by the photo detector as the condition of the light transmitted through the photographic lens varies, so that the shutter speed and the aperture value are renewed on the basis of exposure calculation. Preferably, distance measurement is also conventionally performed in the conventional distance measuring circuit, and the amount of shift appearing on the film surface between the position of a point at which the image of a subject of focusing an object is actually formed and the desired position of that point is continuously calculated, so that the amount of movement of the lens drive mechanism is renewed based thereon and on the lens characteristic data of the photographic lens being employed, and is output to the AF motor control circuit. Focusing by the AF motor continues if it is decided on the basis of the results of distance measuring operation that the amount of shift is out of the focused range. On the other hand, if it is decided that the amount of shift is within the focused range (in other words, that the lens is focused), or that distance measuring is impossible, a signal to stop the AF motor is output to the AF motor control circuit. The output of the clutch operating signal to the clutch control circuit is then stopped by the focus judging circuit to disconnect the coupling of the AF couplers. The clutch operation and method of engaging and disengaging the AF couplers will be described in detail below with reference to FIG. 2. Thus, the AF couplers are disconnected, allowing manual focusing to be performed by the manual focusing member.

Reference (SW3) denotes a release switch which is closed when the release button (not shown in the drawing) is depressed to a second position. When the release switch (SW3) is closed, the value which has been calculated in the exposure calculation is preferably output to a conventional exposure control circuit, so that a series of exposure control operations is preferably conventionally completed. While the release switch (SW3) is open, the focusing is locked in the auto-focusing mode, awaiting the closing of the release switch (SW3). Manual focusing using the manual focusing member starts after the focusing has been locked. Preferably, the AF couplers are disengaged except when the AF motor is being driven. The operation mode is switched over to the auto-focusing mode when the user's finger is released from the release button (not shown in the drawing), even though the AF couplers are disengaged. The above-described operation starts again from the beginning when the release button (not shown in the drawing) is touched by the user's finger, repeating the same processes sequentially as the release button is depressed to the first position and then to the second position.

Now referring to FIG. 2, the engaging and disengaging of the AF couplers and the clutch operation will be described. FIG. 2 is a cross-sectional view of the couplers which are disconnected after the focusing is completed in the auto-focusing mode, when the operation mode is in the manual focusing mode with the photometric and distance-measuring switch (SW1) shown in FIG. 1 turned OFF, or before the focusing is started in the auto-focusing mode. The following explanation is based on the assumption that the couplers are disconnected after the focusing has been completed in the auto-focusing mode.

Reference numeral 1 denotes a lens side mount having a drive transmission shaft 2 which conventionally moves the focusing lens 7 of the conventional photographic lens through the lens side AF coupler 3 by a drive gear 4 and which is mounted on a camera side mount 8. The camera side mount 8 preferably has the camera side AF coupler 10 which transmits the driving force of the AF motor to the lens side AF coupler 3 from a transmission gear 13 through a gear 11 mounted on the circumference of a driving shaft 9. The camera side AF coupler 10 is preferably kept disengaged from the lens side AF coupler 3 by means of a compression spring 12 disposed on the circumference of the driving shaft 9. Preferably, the camera assumes the above-described state when the photometric and distance-measuring switch (SW1) is turned OFF or when the power supply switch (MS) is turned OFF, i.e., when no photograph is being taken by the camera, in addition to the case in which focusing has been completed in the auto-focusing mode as mentioned above.

The disengaged couplers are preferably coupled together through the following processes. If it is judged that the amount of shift is outside the focused range on the basis of the results of the distance-measuring operation, a signal for operating the clutch is output by the focus judging circuit to the clutch control circuit as was previously described. Power is thereby supplied to a plunger 14, and the driving shaft 9 is moved by the plunger 14 in the left hand direction as viewed in FIG. 2 so that the camera side AF coupler 10 is moved from the position at which is is retracted from the mount surface by means of the compression spring 12 and coupled to the lens side AF coupler 3. The coupling operation of the AF coupler is thus completed, and the AF motor is then preferably driven on the basis of the signal for starting focusing which has been output to the AF motor control circuit. Power is preferably kept supplied to the plunger 14 while the AF motor is being driven. The driving force of the AF motor is transmitted to the transmission gear 13 so as to rotate the driving shaft 9 through the gear 11. The lens side AF coupler 3 is driven by the camera side AF coupler 10 fixed to the driving shaft 9, so that the focusing lens 7 of the photographic lens is preferably moved in a focused direction to a focused position by the driving gear 4 and a gear 5.

Since the distance-measuring operation preferably continues during the focusing as described above, if it is decided that the amount of shift is within the focused range (in other words, that the lens is focused), or that distance-measuring is impossible on the basis of the results of the distance-measuring calculation, a signal to stop the AF motor is output by the AF motor control circuit, as was previously described, and the AF motor is stopped, thereby completing the auto-focusing operation. Sequentially, output of the clutch operating signal to the clutch control circuit is preferably stopped by the CPU, and power supply to the plunger 14 is cut by the clutch control circuit. The camera side AF coupler 10 is thereby preferably retracted from the camera side mount surface by the compression spring 12, and is disengaged from the lens side AF coupler 3, thereby preferably allowing the manual focusing using a manual focusing ring 6 provided on the photographic lens to be performed.

According to the present invention, the AF motor is preferably controlled on the basis of the signal output to the AF motor control circuit. In this regard, the motor is preferably stopped when the lens reaches a focused position or when distance-measurement is impossible, and drive of the AF motor is started by the focusing starting signal. The clutch mechanism provided inside the camera body is preferably controlled by outputting a signal to the clutch control circuit by the focus judging circuit. The power supply to the clutch power section is preferably cut by the clutch control circuit when the lens reaches a focused position or when distance-measurement is impossible, thereby preferably disengaging the couplers and switching over the operation mode to the manual focusing mode. Power supply to the clutch power section is preferably started by the clutch control circuit when the focus starting signal is output, thereby coupling the couplers and switching over the operation mode to the auto-focusing mode. Thus, the operation mode is preferably automatically switched over between the auto-focusing and manual focusing modes in a simple manner which is controlled in the camera body. The couplers are preferably kept disengaged except when the AF motor is being driven and are returned to their original disengaged position when power supply to the clutch power section is cut because of the resilient force of the compression spring secured to the driving shaft integrally mounted on the camera side coupler.

By utilizing the above-described preferred arrangement of the present invention, various advantages are obtained over the prior art. For example, when the AF motor is stopped because distance measurement is impossible (such as due to insufficient contrast) and focusing is performed using the manual focusing member, since the couplers have been disengaged by the clutch control circuit and the operation mode has been switched over to the manual focusing mode, the lens driving mechanism provided inside the camera body can be prevented from being damaged. In addition, switching-over of the operation mode can be controlled in the camera body when the auto-focusing mode is selected. Thus, when distance measurement is impossible as described above by way of example, such as due to to insufficient contrast, or when the lens has reached the focused position, the AF motor is stopped, and the AF couplers are then disengaged. Thus, the operation mode is automatically switched over between the auto-focusing and manual focusing modes without operating a push button manually, making the camera operation easier. When the focusing is performed on a subject located at the center in the view finder in the auto-focusing mode, a subject located at a position outside the central zone of the view finder can be photographed because the focusing mode has been switched over to the manual focusing and the focusing has been locked.

What is claimed is:

1. In an autofocus single lens reflex camera system comprising a camera body and a focusing lens mountable on said camera body, with said focusing lens being drivable toward a position at which an image of a photographic subject is formed at a desired focal point on the basis of an amount of detected defocus and direction for said image; said amount of detected defocus corresponding to an amount of shift of a position of a point at which said image of said subject is actually formed from the desired position of a point at which said image of said subject is to be formed, the improvement comprising means for judging if said amount of shift is within a predetermined focused range for said image; said camera body comprising an autofocus drive motor means for automatically driving said lens in response to an autofocus signal until said image is in said focusing range, said lens comprising focus drive means removably couplable to said autofocus drive motor means for enabling said automatic drive of said lens in response to said autofocus signal, and clutch means for removably coupling said autofocus drive motor means to said lens focus drive means for enabling said automatic drive of said lens, said judging means being operatively coupled to said clutch means for automatically disengaging said clutch means when said amount of shift is within said focused range, said lens further comprising manually drivable focus drive means for manually driving said lens when said clutch means is disengaged for manually focusing said lens; whereby said camera may automatically shift between an autofocus mode and a manual focus mode.

2. An improved camera system in accordance with claim 1 wherein said autofocus drive motor means comprises a resiliently biased drive shaft for resiliently biasing said drive shaft to a disengaged position with respect to said lens focus drive means, said clutch means overcoming said resilient biasing to removably couple said autofocus drive motor means to said lens focus drive means until said image is in said focusing range during autofocusing of said image, whereby said autofocus drive motor means and said lens focus drive means are kept disengaged except when said autofocus drive motor means is being driven in response to said autofocus signal.

3. An improved camera system in accordance with claim 2 wherein said resiliently biased drive shaft comprises a compression spring for providing said resilient biasing.

4. An improved camera system in accordance with claim 3 wherein said autofocus drive motor means further comprises an autofocus motor control circuit, said motor control circuit providing a stop signal to said autofocus drive motor means when said lens reaches a focused position.

5. An improved camera system in accordance with claim 1 wherein wherein said autofocus drive motor means further comprises an autofocus motor control circuit, said motor control circuit providing a stop signal to said autofocus drive motor means when said lens reaches a focused position.

6. An improved camera system in accordance with claim 3 wherein said autofocus drive motor means further comprises an autofocus motor control circuit, said motor control circuit providing a stop signal to said autofocus drive motor means when distance measurement of said image is impossible.

7. An improved camera system in accordance with claim 1 wherein said autofocus drive motor means further comprises an autofocus motor control circuit, said motor control circuit providing a stop signal to said autofocus drive motor means when distance measurement of said image is impossible.

* * * * *